(12) United States Patent
Höller

(10) Patent No.: US 11,505,871 B2
(45) Date of Patent: *Nov. 22, 2022

(54) METHOD FOR OPERATING A WATER ELECTROLYSIS DEVICE

(71) Applicant: Hoeller Electrolyzer GmbH, Wismar (DE)

(72) Inventor: Stefan Höller, Lübeck (DE)

(73) Assignee: HOELLER ELECTROLYZER GMBH, Wismar (DE)

( * ) Notice: Subject to any disclaimer, the term of this patent is extended or adjusted under 35 U.S.C. 154(b) by 16 days.

This patent is subject to a terminal disclaimer.

(21) Appl. No.: 16/607,661

(22) PCT Filed: Apr. 23, 2018

(86) PCT No.: PCT/EP2018/060352
§ 371 (c)(1),
(2) Date: Oct. 23, 2019

(87) PCT Pub. No.: WO2018/197419
PCT Pub. Date: Nov. 1, 2018

(65) Prior Publication Data
US 2020/0190674 A1     Jun. 18, 2020

(30) Foreign Application Priority Data

Apr. 24, 2017 (WO) ............... PCT/EP2017/059628

(51) Int. Cl.
*C25B 15/02* (2021.01)
*C25B 15/08* (2006.01)
(Continued)

(52) U.S. Cl.
CPC ............... *C25B 15/02* (2013.01); *C02F 1/42* (2013.01); *C25B 1/04* (2013.01); *C25B 9/19* (2021.01);
(Continued)

(58) Field of Classification Search
None
See application file for complete search history.

(56) References Cited

U.S. PATENT DOCUMENTS 5,935,726 A * 8/1999 Chow ............... H01M 8/04089
429/430
8,685,223 B2 * 4/2014 Kurashina ................. C25B 9/05
205/628
(Continued)

FOREIGN PATENT DOCUMENTS

CN       1239750 C     2/2006
CN       1330792 C     8/2007
(Continued)

OTHER PUBLICATIONS

Machine translation of Tatsumi et al, JP 2002-173788 (Year: 2002).*
(Continued)

*Primary Examiner* — Harry D Wilkins, III
(74) *Attorney, Agent, or Firm* — McGlew and Tuttle, P.C.

(57) ABSTRACT

A method includes operating a water electrolysis device for producing hydrogen and oxygen from water. A PEM electrolyzer (1) is integrated in a water circuit (4) in the electrolysis device. The water circuit (4) feeds reaction water as well as discharges excess water. The water circuit (4) is lead past the PEM electrolyzer (1) via a bypass conduit (14) on starting up the water electrolysis device.

20 Claims, 1 Drawing Sheet

(51) Int. Cl.
*C25B 9/73* (2021.01)
*C25B 13/08* (2006.01)
*C02F 1/42* (2006.01)
*C25B 1/04* (2021.01)
*C25B 9/19* (2021.01)
*C25B 9/23* (2021.01)
*C02F 101/10* (2006.01)

(52) U.S. Cl.
CPC .................. *C25B 9/23* (2021.01); *C25B 9/73* (2021.01); *C25B 13/08* (2013.01); *C25B 15/08* (2013.01); *C25B 15/087* (2021.01); *C02F 2101/10* (2013.01); *Y02E 60/36* (2013.01)

(56) References Cited

U.S. PATENT DOCUMENTS

| | | | |
|---|---|---|---|
| 2003/0230495 | A1 | 12/2003 | Anderson et al. |
| 2008/0264447 | A1 | 10/2008 | Eyal |
| 2012/0090989 | A1* | 4/2012 | Haryu ........................ C25B 1/04 204/237 |
| 2013/0334059 | A1* | 12/2013 | Domon ..................... C25B 1/22 205/554 |
| 2014/0065503 | A1* | 3/2014 | Glipa ................ H01M 8/04544 429/431 |
| 2015/0021170 | A1* | 1/2015 | Wilken .................... C25B 9/23 204/262 |
| 2016/0068975 | A1 | 3/2016 | Smarsch et al. |
| 2020/0095695 | A1 | 3/2020 | Höller |

FOREIGN PATENT DOCUMENTS

| | | | |
|---|---|---|---|
| CN | 104093884 | A | 10/2014 |
| CN | 104126030 | A | 10/2014 |
| CN | 204874763 | U | 12/2015 |
| EP | 1243671 | A1 | 9/2002 |
| EP | 2792769 | A1 | 10/2014 |
| JP | 2001-152378 | A | 6/2001 |
| JP | 2002-173788 | A | 6/2002 |
| JP | 2002302784 | A | 10/2002 |
| JP | 2003-105577 | A | 4/2003 |
| JP | 2003-328170 | A | 11/2003 |
| JP | 2014-074207 | A | 4/2014 |
| JP | 2015-048506 | A | 3/2015 |
| JP | 2020-518718 | A | 6/2020 |
| WO | WO2011/02644 | A1 * | 3/2011 ............ C25B 15/08 |
| WO | 2013/107589 | A1 | 7/2013 |
| WO | 2018/197415 | A1 | 11/2018 |

OTHER PUBLICATIONS

Machine translation of Hashizaki et al, JP 2003-105577 (Year: 2003).*

* cited by examiner

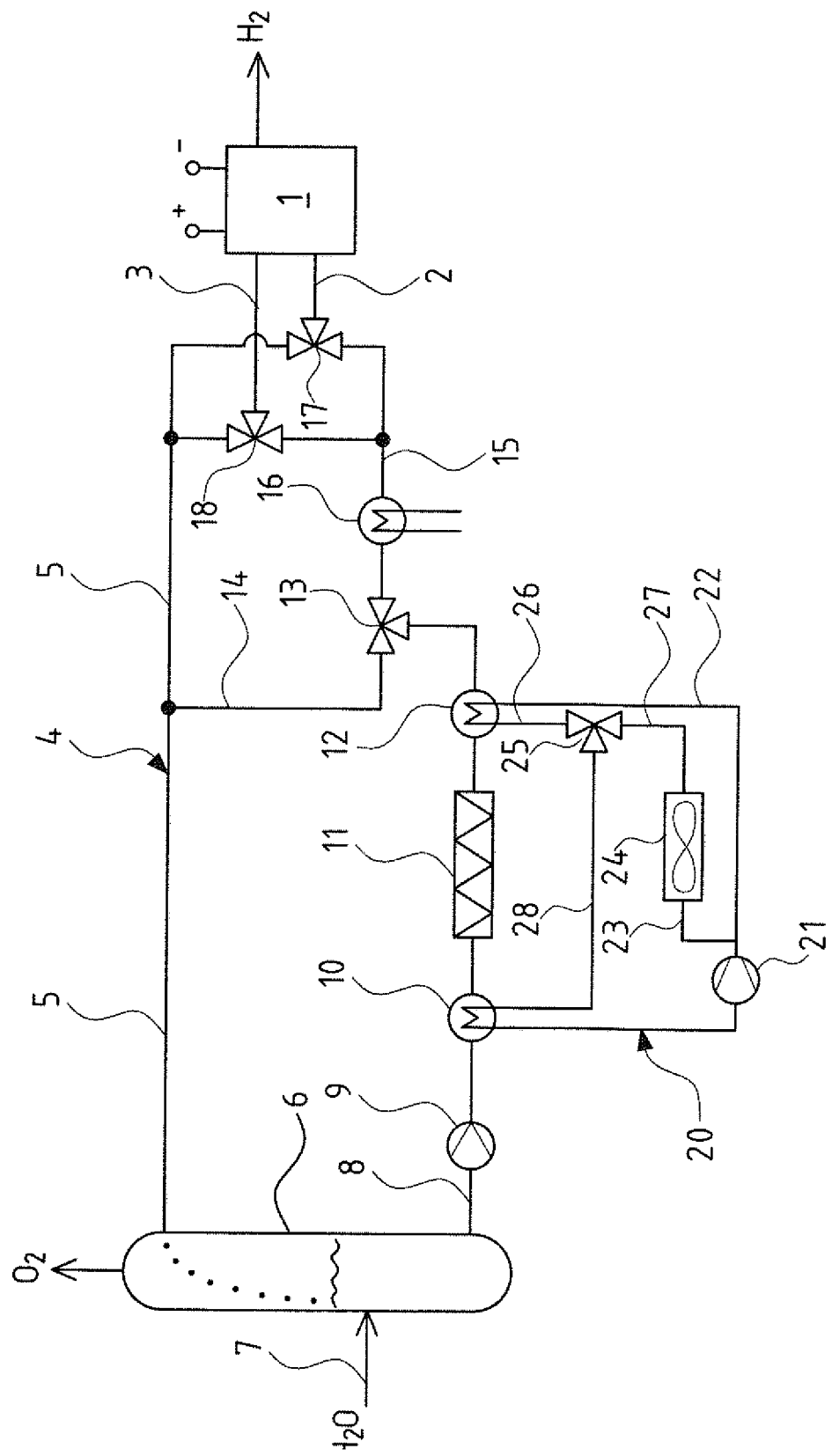

METHOD FOR OPERATING A WATER ELECTROLYSIS DEVICE

CROSS REFERENCE TO RELATED APPLICATIONS

This application is a United States National Phase Application of International Application PCT/EP2018/060352, filed Apr. 23, 2018, and claims the benefit of priority of International Application PCT/EP2017/059628, filed Apr. 24, 2017, the entire contents of which are incorporated herein by reference.

TECHNICAL FIELD

The invention relates to a method for operating a water electrolysis device for producing hydrogen and oxygen from water, concerning which the water for producing hydrogen and oxygen is led into a water circuit, in which a PEM electrolyzer is integrated, as well as to a water electrolysis device for carrying out this method, for producing hydrogen and oxygen from water, concerning which a PEM electrolyzer that is integrated into a water-leading conduit circuit for the feed of water for the electrolysis.

TECHNICAL BACKGROUND

A water electrolysis device of EP 1 243 671 A1, concerning which a PEM electrolyzer is incorporated into a water circuit is counted as belonging to the state of the art. The water which is fed to the PEM electrolyzer is broken up into hydrogen and oxygen, wherein the excess water together with the oxygen is fed to a gas separation container, whose fluid-leading exit conduit is fed to a cooling device and subsequently via a filter back to the PEM electrolyzer. The water which is broken up into hydrogen and oxygen on electrolysis is replaced by demineralized water and is fed to the gas separation container.

Concerning the operation of this electrolysis device, metal ions are released in the PEM electrolyzer, wherein these negatively influence the electrolysis process on renewed feeding of the water and damage the PEM electrolyzer. This can be prevented by way of the upstream arrangement of an ion exchanger, but this demands a temperature reduction of the fed water, in order not to exceed a highest permissible temperature of approx. 60° C. The reduction of the water temperature however worsens the performance and efficiency of the PEM electrolyzer, said PEM electrolyzer preferably being operated with water of a temperature between 70° and 80° C. or higher. Concerning the device which is known from EP 1 243 671 A1, such a temperature reduction is made possible by way of forgoing an ion exchanger which is arranged upstream of the PEM electrolyzer, wherein it is to be ensured that the metal ion content of the water fed to the PEM electrolyzer does not exceed a tolerable value by way of the continuous feed of demineralized water.

A water electrolysis device of EP 2 792 769 A1, concerning which an ion exchanger is arranged upstream of the PEM electrolyzer in the conduit circuit, is counted as belonging to the state of the art. In order here on the one hand not to exceed the temperature which is permissible for the ion exchanger and on the other hand to feed water which is at a higher temperature than that which exits from the ion exchanger to the PEM electrolyzer, a heat exchanger is provided there and this at the primary side leads the water which is fed to the ion exchanger and at the secondary side the water which is led away from the ion exchanger, in a counter-flow, in order to improve this temperature problem. Herein however, a cooling device is additionally necessary between the heat exchanger and the ion exchanger, in order to ensure the entry temperature which is necessary for the ion exchanger. One problem of this arrangement is the fact that the same water quantities must always be led through the heat exchanger which is arranged upstream, at the primary side and at the secondary side, since they lie in the same conduit circuit. The regulator of the cooling device in practice has been found to be insufficient, in order to meet these contradictory temperature demands.

Herein, the service life of the PEM electrolyzer is greatly dependent on the use duration and the purity of the fed water. The power performance and the efficiency increase with an increasing temperature until reaching an operating temperature which typically lies above 80° C.

SUMMARY

Starting from this state of the art, it is an object of the invention to improve a method for operating a water electrolysis device, particularly with regard to the efficiency, service life of the PEM electrolyzer and its electrolysis performance. Furthermore, a water electrolysis device, with which such an improved method can be carried out, is to be provided.

A PEM electrolyzer in the context of the present invention is typically to be understood as a stack of PEM electrolyzer cells as is counted as belonging to the state of the art. Herein, it can possibly also be the case of a multitude of PEM electrolysis cells which are connected in parallel in another shape.

According to the invention, one envisages leading the water circuit past the PEM electrolyzer via a bypass conduit on starting up the water electrolysis device. This measure also contributes to the longevity of the PEM electrolyzer, since ion exchangers, when they are not subjected to throughflow but the medium therein is at a standstill as with a shut-down electrolysis device, typically have the characteristic of releasing metals ions to the water, said metals ions then getting into the PEM electrolyzer with the next start-up of the device and damaging this. This can be effectively prevented by leading through the bypass on starting up. The metal ions which are located in the water circuit there are then removed given a renewed flow through the ion exchanger.

In order to bring the power of the PEM electrolyzer as quickly as possible to a high level on starting up the electrolysis device, according to a further development of the invention one envisages the water which is fed to the PEM electrolyzer being preheated by way of a heating device. This is typically effected by way of an electrical heater which heats the water which is cold on starting up the device, in the manner of a continuous heater.

In order to increase the service life of the PEM electrolyzer, said PEM electrolyzer typically being designed as a stack, and hence to also increase the performance over the longer term, according to a further development of the invention one envisages periodically reversing the throughflow direction through the PEM electrolyzer, wherein according to the invention it is not compellingly the case of always achieving equally long throughflow intervals in each direction, but of a more or less uniform distribution over the operational duration. Periodically in the context of the invention is therefore not to be understood in the strict mathematical sense, but in the context of alternating. Herein, it is preferably such that the reversal is not effected during the operation, but after the shutting down of the electrolysis device or before the starting-up, when this has been at a standstill in any case. However, if the electrolysis device runs in a continuous manner, then such a rerouting can also possibly be effected during the operation.

The method for operating a water electrolysis device for producing hydrogen and oxygen, concerning which, in a water circuit, water coming from a PEM electrolyzer is fed to a first heat exchanger for cooling, subsequently to an ion exchanger and then to a second heat exchanger for heating and again to the PEM electrolyzer, is improved in that the heat exchangers at the secondary side form part of a common heat transfer medium circuit, wherein the heat transfer medium circuit comprises a cooling device, through which the heat transfer medium flow is led selectively in a complete or partial manner or not at all, for the control and/or regulation of the temperature of water fed to the ion exchanger and/or of the temperature of the water fed to the PEM electrolyzer.

The basic concept of this method is to do firstly without a cooling device in the water circuit of the electrolyzer and instead of this to control, preferably regulate (closed-loop control) either the temperature of the water fed to the ion exchanger or the temperature of the water fed to the PEM electrolyzer or both temperatures, by way of the heat transfer medium flow which is led through the heat exchanger at the secondary side being fed completely, fed partly or not fed at all, to a cooling device depending on the requirements. Herein, the cooling device is preferably connected in parallel to the second heat exchanger via a mixing valve, so that the heat transfer medium flow which exits from the cooling device is firstly fed to the first heat exchanger and then completely or partly to the second heat exchanger or again to the cooling device. Given the application of a suitable control and regulation device, with this arrangement either the temperature of the water fed to the PEM electrolyzer can be regulated in the necessary manner, or the temperature of the water fed to the heat exchanger. If, as is likewise envisaged according to the invention, both these temperatures are to be regulated, then it will be necessary to provide a further regulator (actuator) and this for example can be the power of the cooling device, thus the cooling power and/or the flow throughput through the heat transfer medium circuit, said flow throughput being able to be varied for example by way of a suitable activation of a speed-controllable circulation pump. The aforementioned regulation essentially relates to the temperature regulation during the run-in operation and for starting up the PEM electrolyzer this temperature must firstly be reached at least approximately.

Alternatively, according to the invention, the cooling device of the heat transfer medium circuit can be arranged upstream of the first heat exchanger in the through-flow direction which is to say in series with this. The throughput which is fed to the second heat exchanger or which is fed to the cooling device whilst bypassing of the second heat exchanger is then controlled via a mixing valve. The cooling device is to be controllable in its power given such an arrangement.

The basic concept of the method according to the invention is therefore not to cool the water circuit in a direct manner, but to incorporate a cooling device in the secondary circuit, wherein advantageously both heat exchangers are assigned to the same heat transfer medium circuit and the temperature control or regulation is effected merely by way of leading the heat transfer medium through a cooling device in a complete or partial manner or not at all.

Herein, the first and second heat exchangers also do not necessarily need to consist of a single heat exchanger, and herein it can also be the case of one or more individual heat exchangers which are connected in parallel and/or series. This analogously applies to the cooling device and to the ion exchanger, wherein the cooling device typically comprises a heat exchanger, whose primary side lies in the heat transfer medium circuit and through whose secondary side a cooling medium, for example air or cooling fluid from a cooling assembly can flow.

In the present application, on the one hand the terms water circuit or conduit circuit and on the other hand the term heat transfer medium circuit are used throughout. Water circuit or conduit circuit denotes the primary circuit, in which the PEM electrolyzer and the ion exchanger lie, and heat transfer medium circuit denotes the secondary circuit which at the secondary side leads through the heat exchanger which is arranged upstream or downstream of the ion exchanger but which can be operated in the same manner with water as a heat transfer medium. Here, it is typically not demineralized or distilled water which is used but common tap water, possible amid the admixing of glycerine or also other additives.

The preheating of the water which is fed to the PEM electrolyzer supplements the regulation according to the invention in an ideal manner, said regulation initially not yet functioning in the desired manner given too low a temperature in the water circuit. The heating device does not necessarily need to be arranged in the primary circuit but can also be provided in the heat transfer medium circuit, for example upstream of the further heat exchanger in the throughflow direction, said further heat exchanger serving in any case for heating the water which is fed to the PEM electrolyzer. Herein, the heating device can already be activated during the initial bypass operation, so that preheated water goes directly into the PEM electrolyzer on disconnecting the bypass conduit. Furthermore, on account of the previous leading through the bypass, this is also freed of metal ions in an adequate manner, said metal ions having gotten into the water within the ion exchanger on standstill of the circulation.

According to the invention, a bypass conduit which can preferably be shut off by way of a valve is provided in the conduit circuit parallel to the PEM electrolyzer. This bypass conduit can also be formed by a valve itself, as is yet explained further below. Such a bypass conduit is advantageous for starting up the electrolysis device, in order to lead the water circuit past the PEM electrolyzer, in order for example not to lead the water which is stagnant in the ion exchanger and which could be enriched with metal ions, through the electrolyzer, but only to incorporate the electrolyzer into the conduit circuit when it is ensured that the water which is fed to the PEM electrolyzer and which comes from the ion exchanger is free of metal ions to a sufficient degree, which is to say that the ion exchanger operates in an effective manner.

The activation of the bypass function in a multitude of application cases is most favourably effected by way of a valve. However, it can also be effected by way of a pump which is integrated into the conduit or by way of a shut-off valve which is connected upstream of the PEM electrolyzer, in combination with a pressure-limitation valve which is arranged in the bypass conduit.

The electrolysis device according to the invention, according to a further development advantageously comprises a start-up control which during the start-up phase leads the conduit circuit through a bypass whilst bypassing the PEM electrolyzer. This start-up control can be part of the control and regulation device, but it can also be realised independently of this and in the simplest form activates the shut-off valve to open during the start-up phase. On using a 4/3-way valve as described beforehand, this start-up control can be designed to activate the third switching position of the valve which forms the bypass.

In order to arrive as quickly as possible at a high power on starting up the electrolysis device, which is to say the electrical power uptake of the PEM electrolyzer and therefore a high as possible produced quantity of gas, according to the invention a heating device can advantageously be connected upstream of the PEM electrolyzer, in particular in the conduit circuit between the ion exchanger and the PEM electrolyzer. Usefully, this heating device is arranged downstream of the further heat exchanger and upstream of the PEM electrolyzer. Alternatively, such a heating device can be provided in the heat transfer medium circuit, and specifically connected upstream of the further heat exchanger in the throughflow direction at the secondary side. The heating device does not necessarily need to be an electrical heater, but a heat exchanger can also be provided here, the other side of which for example leads the dissipated heat from a combustion engine.

As initially described, in order to permit a direction reversal of the flow through the PEM electrolyzer within the conduit circuit, according to a further development of the invention a valve arrangement, with which this can be realized, is provided.

Advantageously, this can be effected by way of the provision of two 3/2-way valves, wherein one of the valves is connected to the one water connection of the PEM electrolyzer as well as to the feeding and discharging conduit of the conduit circuit and the other valve is connected to the other conduit connection of the PEM electrolyzer as well as likewise to the feeding and discharging conduit of the conduit circuit. Such 3/2-way valves are inexpensively obtainable on the market, even with the special material demands which are necessary here for the conduit circuit. The valve parts which are in contact with the water circuit are coated for example with Teflon or are titanium-coated or consist thereof.

If, as is advantageous, the two 3/2-way valves are replaced by 3/3-way valves, then not only can a reversal of the flow direction through the PEM electrolyzer be controlled with these valves, but also a bypass operation, without an additional bypass valve and a bypass conduit having to be provided. Herein, it is particularly advantageous if these 3/3-way valves are designed in the manner of the ball-cock type, since they can then be realised inexpensively and in a functionally reliable manner. Such a directional valve typically comprises three connections which are arranged offset by 90° to one another, as well as a ball with a T-shaped inner bore, so that two of the three connections are conductively connected to one another in each case depending on the switching position.

Instead of two 3/2-way valves, a connection of the PEM electrolyzer to the conduit circuit can also be advantageously effected by way of a 4/2-way valve, wherein the two switching positions correspond to the two throughflow directions. If, instead of the 4/2-way valve, which is advantageous, a 4/3-way valve which in the third switching position connects the feeding and discharging conduit of the conduit circuit to one another is used, then by way of a single valve, the direction reversal of the flow through the PEM electrolyzer as well as the bypass function for starting up the electrolysis device can be realized with only one valve, which is advantageous.

The valves are advantageously formed from stainless steel. Alternatively, suitably coated valves, for example Teflon-coated or titanium-coated valves can be used, and it is also conceivable to manufacture the valves of titanium or other suitable materials.

The electrolysis device advantageously comprises a reversal control which in temporal intervals re-routes the valves which are assigned to the PEM electrolyzer, in order to achieve a reversal of the throughflow direction. This reversal control can likewise be designed as part of the control and regulation device or be designed in a separate manner.

The water electrolysis device according to the invention for producing hydrogen and oxygen from water comprises a conduit circuit for the distilled, at least demineralised water, in which circuit a PEM electrolyzer, a first heat exchanger, an ion exchanger and a further heat exchanger are successively arranged, wherein the exit of the further heat exchanger is conductively connected to the PEM electrolyzer. The water-leading exit of the PEM electrolyzer is typically the oxygen-leading exit, from which water and oxygen simultaneously exit, these being subsequently separated, wherein the water is fed in the conduit circuit. Herein, the first as well as the further heat exchanger are incorporated into a common heat transfer medium circuit at the secondary side, wherein a cooling device which can be variably incorporated into the heat transfer medium circuit via a controllable fitting is assigned to this heat transfer medium circuit. Herein, the cooling device is also preferably controllable itself with regard to its cooling power, and alternatively or additionally a control via the throughput speed in the heat transfer medium circuit can be provided.

Herein, the basic concept is to assign the heat exchangers upstream and downstream of the ion exchanger to a common, secondary-side heat transfer medium circuit whilst forgoing a cooling device in the conduit circuit and to integrate a cooling device in this heat transfer medium circuit, said cooling device being able to be incorporated into the heat transfer medium circuit in a complete or partial manner or not at all, via a controllable fitting, preferably in an infinite manner.

According to a further development of the invention, the water electrolysis device comprises a control and regulation device which controls the fitting or the cooling device or both for the purpose of temperature regulation of the water which is fed to the ion exchanger or to the PEM electrolyzer or to both. The regulation device is preferably designed for the temperature regulation of the water which is fed to the PEM electrolyzer, since this temperature is decisive for the performance of the whole device.

Since, in the process, typically more heat is to be dissipated in the conduit circuit than is necessary for heating the water which is to be fed to the PEM electrolyzer, according to the invention a stepwise regulation can also be effected, this being of a nature such that the water temperature which is fed to the PEM electrolyzer is primarily regulated and the water temperature which is fed to the ion exchanger is merely regulated with regard to a limit temperature, wherein this limit temperature for example is maximally 60° C.

According to an advantageous further development of the invention, the fitting is a mixing valve (also called mixer) as is counted as belonging to the state of the art for example from heating technology. Such a mixing valve can be controlled by way of a servomotor and can be provided in a cost-effective manner. Since it is the case of the (secondary-side) heat transfer medium circuit, here a simple tried-and-tested and inexpensive fitting from heating technology can be used.

According to an advantageous further development of the invention, a speed-controllable circulation pump whose speed is controlled by the control and regulation device is arranged in the heat transfer medium circuit. Such circulation pumps which are typically controlled by frequency converter are likewise inexpensively available from heating technology and can operate in wide power ranges. The use of such a circulation pump not only makes sense if the delivery flow is to be used as a further control variable for a regulation, but also if this requirement is not given, in order to be able to operate the heat transfer medium circuit in an energetically favorable manner.

The cooling device is advantageously connected parallel to the further heat exchanger, thus to the heat exchanger between the ion exchanger and the PEM electrolyzer, so that the heat transfer medium flow which exits from the cooling device is firstly fed to the first heat exchanger which is provided for cooling down the water which enters the ion exchanger. The fitting, in particular the mixing valve can either be incorporated into the branching conduit which comes from the first heat exchanger and leads to the further heat exchanger or to the cooling device, or however preferably in the run-out region of these conduits, which is to say where the conduit from the further heat exchanger, the conduit coming from the cooling device and the conduit leading to the first heat exchanger meet one another. It is to be understood that the terms all relate to the designated throughflow direction. Alternatively, the cooling device can be incorporated in the conduit of the heat transfer medium circuit which leads to the first heat exchanger, and it is then preferably the case of a cooling device which can be controlled in its power. With the mixing valve one then controls which shares of the heat transfer medium flow are led through the further heat exchanger and which are led past this (bypass this).

The invention is hereinafter explained in more detail by way of one embodiment example. The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the drawing:
The single FIGURE is a greatly simplified representation showing a circuit diagram of an electrolysis device, concerning which the components which are not essential to the present invention are not represented.

DESCRIPTION OF PREFERRED EMBODIMENT

Referring to the drawings, the represented water electrolysis device comprises a PEM electrolyzer 1 which is designed in the usual form as a stack and comprises a first conduit connection 2 as well as a second conduit connection 3, with which the stack 1 is incorporated into a conduit circuit 4 which comprises a conduit 5 which leads away from the PEM electrolyzer 1 and in which the water which exits from the PEM electrolyzer 1 is led fed together with the oxygen which is produced therein to a container 6 which on the one hand serves for separating the oxygen and on the other hand serves for feeding the electrolyzer 1 with water. This container 6 is therefore a supply container. The water which is removed from the conduit circuit 4 via the electrolyzer 1 by electrolysis is fed to the container 6 via a conduit 7. Hereby, it is the case of demineralised or distilled water. The water-leading exit 8 of the container 6 is conductively connected via a circulation pump 9 to a first heat exchanger 10, whose exit is conductively connected to an entry of an ion exchanger 11, whose exit is connected to a further, here second heat exchanger 12, whose exit is connected via a 3/2-way valve 13 either to a bypass conduit 14 or to a conduit 15 which leads to the PEM electrolyzer and in which an electrical heater 16 is integrated.

The discharging conduit 5 and the feeding conduit 15 are each connected to the PEM electrolyzer 1 via a 3/2-way valve, and specifically via a first 3/2 way valve 17 which connects these conduits to the first connection 2 of the electrolyzer 1, as well as via a second 3/2-way valve 18 which connects these conduits to the second connection 3 of the PEM electrolyzer.

In normal operation, the water is led in the conduit circuit 4 by way of it exiting from the container 6 and firstly being led to the circulation pump 9 and from there through the primary side of the first heat exchanger 10. The water is cooled down to a temperature (for example below 60° C.) in this heat exchanger 10, in order to ensure that a high as permissible operating temperature of the subsequent ion exchanger 11 is not exceeded. After exit from the ion exchanger 11, the water is fed at the primary side to the second heat exchanger 12, in which this is heated to a temperature for example of 70° C. to 80° C., in order to then be fed to the PEM electrolyzer 1, be it via the first connection 2 or on reversal of the throughflow direction via the second connection 3. Herein, the temperature to which the second heat exchanger 12 heats the water is selected such that the subsequent electrolysis process in the electrolyzer 1 takes its course at a high efficiency and at a high power. The water which exits from the electrolyzer 1 together with the oxygen is fed via the second connection 3 or, given a flow reversal, via the second connection 2, into the discharging conduit 5, to the container 6 where a gas separation is effected and the circuit 4 closes at the water side.

The heat exchangers 10 and 12 at the secondary side are assigned to a common heat transfer medium circuit 20 which by way of a speed-controllable circulation pump 21 feeds the heat transfer medium, typically water with an additive, which exits the first heat exchanger 10 at the secondary side, via a conduit 22 to the secondary-side entry of the second heat exchanger 12, as well as via a conduit 23 to a cooling device 24 which is arranged parallel to the second heat exchanger 12 and is incorporated into the heat transfer medium circuit via a mixing valve 25 being. The mixing valve unifies a conduit 26 which comes from the second heat exchanger 12 at the secondary side, with a conduit 27 which comes from the cooling device 24, into a conduit 28 which leads to the first heat exchanger 10. In an end position of the mixing valve 25, the cooling device 24 is not incorporated into the heat transfer medium circuit 20, and the secondary sides of the heat exchangers 10 and 12 are then conductively connected to one another via the conduits 26 and 28, and the circulation is effected via the pump 21 and the conduit 22 which connects thereto. The conduit 26 which comes from the second heat exchanger 12 is shut off with respect to the conduit 28 which leads to the first heat exchanger 10 and the conduit 27 which comes from the cooling device 24 is connected to the conduit 28, by way of changing the position of the mixing valve from the this first end position into a second end position. This end position is somewhat of a theoretical nature, since the conduit 26 in practice is not completely closed. It is determined how much heat is dissipated out of the heat transfer medium circuit 20 depending on the extent of the release of the heat transfer medium flow which exits the cooling device 24 via the conduit 27, which is to say is led to the first heat exchanger 10 via the conduit 28.

A control and regulation device which is not shown in the FIGURE is provided, and this ensures that the position of the mixing valve 25 is activated such that the water which is fed to the PEM electrolyzer 1 has a predefined temperature for example of 80° C. This temperature is decisive for the performance of the PEM electrolyzer 1 and thus also for the complete electrolysis device. Basically, the water temperature which is fed to the ion exchanger 10 can also be regulated by way of activating the mixing valve 25. Since however it is not a question of maintaining a precise temperature here, but of merely ensuring that the entry temperature lies below for example 60° C., here a secondary regulation is superimposed, said secondary regulation either being effected via speed activation of the circulation pump 21 or by way of the control of the power of the cooling device 24.

This control and regulation device further ensures that on starting up the electrolysis device, thus when the water which is located in the circuit 4 does not yet have the desired operating temperature, this water is preheated via the electric heater 16. However, before such a preheating is effected, the 3/2-way valve is re-routed via a start-up control in such a manner that the PEM electrolyzer 1 is bridged by the bypass conduit 14, which is to say that the water which exits from the ion exchanger 11 and is fed through the second heat exchanger 12 is firstly not fed to the PEM electrolyzer 1, but to the leading-back conduit 5 and thus to the container 6. This activation is effected until it is ensured that the complete water which is located in the ion exchanger and which was located there gets into the leading-back conduit 5. It is only then that the valve 13 is re-routed, so that the water which is led in the water circuit 4 is fed to the heater 16 and therefore preheated, gets into the PEM electrolyzer 1.

Furthermore, the control and regulation device ensures that the 3/2-way valves 17 and 18 which determine the throughflow direction through the PEM electrolyzer 1 are re-routed in temporal intervals. In a first position, the 3/2-way valve 17 connects the feeding conduit 15 to the first conduit connection 2 of the PEM electrolyzer 1, wherein the conduit connection 2 to the discharging conduit 5 is blocked, and in an analogous manner the second 3/2-way valve 50 connects to second conduit connection 3 of the PEM electrolyzer 1 to the discharging conduit 5, wherein the conduit connection to the feeding conduit 15 is blocked. After re-routing both valves 17, 18 which is to occur simultaneously, the 3/2-way valve 17 connects the first conduit connection 2 of the PEM electrolyzer 1 to the discharging conduit 5 and blocks the feeding conduit 15, whereas the second 3/2-way valve connects the second conduit connection 3 of the PEM electrolyzer 1 to the feeding conduit 15 and blocks the conduit connection to the discharging conduit 5. Herewith, the PEM electrolyzer 1 is subjected to throughflow in the opposite direction.

If instead of the 3/2-way valves 17, 18, 3/3-way valves are provided, then the 3/2-way valve 13 and the bypass conduit 14 can be done away with. The reversal of the throughflow direction as well as the bypass function can then be realized with these two 3/3-way valves. Directional valves of the ball-cock construction type can advantageously be applied for this, said valves in the valve casing 3 having conduit connections which are offset by 90° to one another, as is schematically represented in the FIGURE at the valves 17 and 18 and which have a valve body in the form of a ball which has a through-bore which is T-shaped in cross section and to which two of the in total three connections are conductively connected.

Instead of arranging the cooling device 24 in the conduit 23, 27, thus parallel to the second heat exchanger, this could be arranged in the conduit 28, wherein it should then preferably be the case of a cooling device which is controllable in its cooling power. The conduit 23, 27 which is arranged in parallel to the second heat exchanger 12 would thus be retained, and then the heat transfer medium flow which is fed to the second heat exchanger 12 and that which is led past (bypasses) the conduit 23, 27 in parallel would then be controlled via the mixing valve 25.

In the embodiment example which is described above, the electrical heater is arranged in the conduit 15 which leads to the PEM electrolyzer 1. Alternatively, such an electrical heater can also be arranged in the heat transfer medium circuit, typically upstream of the second heat exchanger 12 in the through-flow direction, thus in the conduit 22. Such an arrangement has the advantage that the heating does not especially need to be adapted to the demands placed on the primarily circuit, but that inexpensive components known from heating technology or other technologies can also be applied inasmuch as this is concerned.

While specific embodiments of the invention have been shown and described in detail to illustrate the application of the principles of the invention, it will be understood that the invention may be embodied otherwise without departing from such principles.

The invention claimed is:

1. A method for operating a water electrolysis device for producing hydrogen and oxygen from water, the method comprising the steps of:
   providing the water electrolysis device, which water electrolysis device comprises a water-leading circuit, a PEM electrolyzer integrated into the water-leading circuit for the feed of water for the electrolysis, and a bypass conduit, which includes a valve that can shut off flow through the bypass conduit, provided in the water-leading circuit parallel to the PEM electrolyzer;
   leading water for producing hydrogen and oxygen into the water-leading circuit, in which the PEM electrolyzer is integrated; and
   leading the water in the water-leading circuit past the PEM electrolyzer via the bypass conduit on starting up the water electrolysis device.

2. A method according to claim 1, wherein water is fed to the PEM electrolyzer and the fed water is preheated by way of a heating device.

3. A method for operating a water electrolysis device according to claim 2, wherein a flow direction through the PEM electrolyzer is periodically reversed, in each case after shutting down the electrolysis device.

4. A method for operating a water electrolysis device according to claim 1, wherein:
   in the water-leading circuit, water which comes from a PEM electrolyzer is fed to a first heat exchanger for cooling, subsequently is fed to an ion exchanger, then is fed to a second heat exchanger for heating and is again fed to the PEM electrolyzer;
   the heat exchangers form part of a common heat transfer medium circuit at a secondary side; and the heat transfer medium circuit comprises a cooling device, through which the heat transfer medium flow is selectively led in a complete or partial manner or not at all, for a control and/or regulation of a temperature of the water which is fed to the ion exchanger and/or to the PEM electrolyzer.

5. A water electrolysis device for producing hydrogen and oxygen from water, the device comprising:
a water-leading circuit;
a PEM electrolyzer configured to produce hydrogen and oxygen from water delivered to the PEM electrolyzer via the water-leading circuit, the PEM electrolyzer being integrated into the water-leading circuit for the feed of the water for the electrolysis;
a bypass conduit, which includes a valve that can shut off flow through the bypass conduit, provided in the water-leading circuit parallel to the PEM electrolyzer; and
a common heat transfer medium circuit with a controllable fitting assigned thereto, a cooling device, first heat exchanger, an ion exchanger and a further heat exchanger, wherein:
the PEM electrolyzer, the first heat exchanger, the ion exchanger and the further heat exchanger whose exit is conductively connected to the PEM electrolyzer are successively arranged in the water-leading circuit;
the first and the further heat exchanger are integrated into a common heat transfer medium circuit at the secondary side; and
the cooling device is controllable with regard to cooling power and is integrated into the heat transfer medium circuit via the controllable fitting assigned to the heat transfer medium circuit.

6. A water electrolysis device according to claim 5, further comprising a start-up control, said start-up control, during a start-up phase, leading the water being fed in the water-leading circuit through the bypass conduit and bypassing the PEM electrolyzer.

7. A water electrolysis device according to claim 5, further comprising a valve arrangement connected to the PEM electrolyzer to reverse a direction of flow through the PEM electrolyzer.

8. A water electrolysis device according to claim 7, wherein:
the water-leading circuit includes a feeding conduit and a discharging conduit; and
an entry and an exit of the PEM electrolyzer are each connected to the feeding conduit and the discharging conduit of the conduit circuit via a 3/2-way valve of the valve arrangement.

9. A water electrolysis device according to claim 7, wherein:
the water-leading circuit includes a feeding conduit and a discharging conduit;
an entry and exit of the PEM electrolyzer are each connected to the feeding or the discharging conduit of the water-leading circuit via a 3/3-way valve of the valve arrangement; and
the valves are configured as a ball-cock construction type.

10. A water electrolysis device according to claim 7, wherein:
the water-leading circuit includes a feeding conduit and a discharging conduit;
an entry and an exit of the PEM electrolyzer are connected to the feeding and the discharging conduit of the water-leading circuit via a 4/2-way valve of the valve arrangement or a 4/3-way valve of the valve arrangement.

11. A water electrolysis device according to claim 7, further comprising a reversal control which in temporal intervals reroutes a flow though the valves of the valve arrangement which valves are assigned to the PEM electrolyzer.

12. A water electrolysis device according to claim 5, further comprising a control and regulation device activating the fitting and/or the cooling device for the purpose of temperature regulation of the water which is fed to the ion exchanger and/or to the PEM electrolyzer.

13. A water electrolysis device according to claim 5, further comprising a speed-controllable circulation pump whose speed is controlled by the control and regulation device is arranged in the heat transfer medium circuit.

14. A water electrolysis device according to claim 5, wherein the fitting is a mixing valve.

15. A water electrolysis device according to claim 5, wherein the cooling device in the heat transfer medium circuit is connected parallel to the further heat exchanger or is connected in series to the first heat exchanger upstream thereof, in the throughflow direction.

16. A water electrolysis device according to claim 5, further comprising a heating device connected upstream of the PEM electrolyzer and integrated in the water-leading circuit between the exit of the further heat exchanger and the entry of the PEM electrolyzer or is connected upstream of the further heat exchanger in the heat transfer medium circuit.

17. A water electrolysis device for producing hydrogen and oxygen from water, the device comprising:
a water-leading circuit;
a PEM electrolyzer integrated into the water-leading circuit for the feed of water for the electrolysis, the PEM electrolyzer being configured to produce hydrogen and oxygen from water delivered via the water-leading circuit;
a bypass conduit, which includes a valve that can shut off flow through the bypass conduit, provided in the water-leading circuit parallel to the PEM electrolyzer, wherein the bypass conduit is configured to transport the water such that the water bypasses the PEM electrolyzer, the bypass conduit being in fluid communication with another conduit configured to transport the water and the oxygen produced via the PEM electrolyzer; and
a start-up control, the start-up control, during a start-up phase, leading the water being fed in the water-leading circuit through the bypass conduit and bypassing the PEM electrolyzer.

18. A water electrolysis device according to claim 17, further comprising a common heat transfer medium circuit with a controllable fitting assigned thereto, a cooling device, first heat exchanger, an ion exchanger and a further heat exchanger, wherein:
the PEM electrolyzer, the first heat exchanger, the ion exchanger and the further heat exchanger whose exit is conductively connected to the PEM electrolyzer are successively arranged in the water-leading circuit;
the first and the further heat exchanger are integrated into a common heat transfer medium circuit at the secondary side; and the cooling device is controllable with regard to cooling power and is integrated into the heat transfer medium circuit via the controllable fitting assigned to the heat transfer medium circuit.

19. A water electrolysis device for producing hydrogen and oxygen from water, the device comprising:
   a water-leading circuit;
   a PEM electrolyzer configured to produce hydrogen and oxygen from water delivered to the PEM electrolyzer via the water-leading circuit, the PEM electrolyzer being integrated into the water-leading circuit for the feed of the water for the electrolysis;
   a bypass conduit, which includes a valve that can shut off flow through the bypass conduit, provided in the water-leading circuit parallel to the PEM electrolyzer; and
   a start-up control, said start-up control, during a start-up phase, leading the water being fed in the water-leading circuit through the bypass conduit and bypassing the PEM electrolyzer.

20. A water electrolysis device for producing hydrogen and oxygen from water, the device comprising:
   a water-leading circuit;
   a PEM electrolyzer integrated into the water-leading circuit for the feed of water for the electrolysis, the PEM electrolyzer being configured to produce hydrogen and oxygen from water delivered via the water-leading circuit;
   a bypass conduit, which includes a valve that can shut off flow through the bypass conduit, provided in the water-leading circuit parallel to the PEM electrolyzer, wherein the bypass conduit is configured to transport the water such that the water bypasses the PEM electrolyzer, the bypass conduit being in fluid communication with another conduit configured to transport the water and the oxygen produced via the PEM electrolyzer; and
   a common heat transfer medium circuit with a controllable fitting assigned thereto, a cooling device, first heat exchanger, an ion exchanger and a further heat exchanger, wherein:
      the PEM electrolyzer, the first heat exchanger, the ion exchanger and the further heat exchanger whose exit is conductively connected to the PEM electrolyzer are successively arranged in the water-leading circuit;
      the first and the further heat exchanger are integrated into a common heat transfer medium circuit at the secondary side; and
      the cooling device is controllable with regard to cooling power and is integrated into the heat transfer medium circuit via the controllable fitting assigned to the heat transfer medium circuit.

* * * * *